(12) United States Patent
Chen et al.

(10) Patent No.: US 7,410,185 B2
(45) Date of Patent: Aug. 12, 2008

(54) FOLDABLE STROLLER FRAME ASSEMBLY

(75) Inventors: Shun-Min Chen, Taipei (TW); Wen-Qu Hu, Taipei (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 148 days.

(21) Appl. No.: 11/222,700

(22) Filed: Sep. 8, 2005

(65) Prior Publication Data

US 2007/0052208 A1 Mar. 8, 2007

(30) Foreign Application Priority Data

Jun. 22, 2005 (CN) .................. 2005 2 0110627 U

(51) Int. Cl.
*B62B 7/08* (2006.01)
(52) U.S. Cl. .................. 280/642; 280/650; 280/658
(58) Field of Classification Search ............. 280/642, 280/643, 647, 648, 650, 657, 658, 79.2, 47.38
See application file for complete search history.

(56) References Cited

U.S. PATENT DOCUMENTS

| | | | | |
|---|---|---|---|---|
| 3,550,998 A | * | 12/1970 | Stanley et al. ............ | 280/31 |
| 4,736,959 A | * | 4/1988 | Van Steenburg ........... | 280/30 |
| 5,364,119 A | | 11/1994 | Leu ........................... | 280/647 |
| 5,669,624 A | * | 9/1997 | Eichhorn .................... | 280/642 |
| 6,036,220 A | | 3/2000 | Zhen ......................... | 280/642 |
| 6,402,166 B1 | * | 6/2002 | Chiu ....................... | 280/47.38 |
| 6,779,804 B1 | * | 8/2004 | Liu ........................ | 280/47.38 |
| 6,851,700 B2 | * | 2/2005 | Yoshie et al. ............. | 280/642 |
| 7,118,116 B2 | * | 10/2006 | Lin ........................ | 280/47.38 |
| 2003/0193172 A1 | | 10/2003 | Lin ............................ | 280/642 |
| 2003/0201626 A1 | | 10/2003 | Hartenshine et al. ........ | 280/642 |

FOREIGN PATENT DOCUMENTS

DE   200 16338 U1   9/2000
DE   20 2004 020 186 U1   7/2004

OTHER PUBLICATIONS

UK Search Report dated Jun. 13, 2006 related to GB 0608581.5.

* cited by examiner

*Primary Examiner*—Frank B Vanaman
(74) *Attorney, Agent, or Firm*—DLA Piper US LLP

(57) ABSTRACT

A foldable stroller frame assembly includes a bottom frame unit, front and rear frame units connected pivotally to the bottom frame unit, and a handle unit pivotable relative to the front and rear frame units. The bottom frame unit includes a generally V-shaped bottom frame member adapted for mounting rotatably a pair of rear wheels thereon, and a wheel mounting frame member connected to the bottom frame member and adapted for mounting rotatably a front wheel thereon.

8 Claims, 5 Drawing Sheets

FOLDABLE STROLLER FRAME ASSEMBLY

BACKGROUND OF THE INVENTION

1. Field of the Invention

The present invention relates to a stroller, more particularly to a foldable stroller frame assembly that has a relatively small size when folded.

2. Description of the Related Art

Strollers are designed to be foldable to facilitate storage and transport.

Referring to FIGS. 1 to 3, U.S. Patent Application Publication No. US 2003/0201626 A1 discloses a stroller that can be folded (see FIG. 2) and unfolded (see FIG. 1). A frame of the stroller includes two front legs 112 and two rear legs 132. Hinge brackets 118 interconnect pivotally lower ends of the front legs 112 to front ends of the rear legs 132. The lower ends of the front legs 112 are joined to spindles 122, which are used for mounting front casters 124 thereon. Rear wheels 136 are mounted to rear ends of the rear legs 132. Each of the support struts 150 extends between a respective one of the front legs 112 and a respective one of the rear legs 132. Each support strut 150 has a lower end pivoted to the respective rear leg 132. Each support strut 150 further has an upper end connected to the respective front leg 112 and to a respective push arm 184 of a handle 180 via a corresponding fold latch 200.

When the stroller frame is unfolded, the rear legs 132 are disposed at a shallow angle to the horizontal, the front casters 124 and the rear wheels 136 are disposed on the ground, the front legs 112 and the support struts 150 extend upwardly, and the push arms 184 extend upwardly in the same direction as the front legs 112. To fold the stroller frame, a rotatable grip 186 on the handle 180 is operated, and the push arms 184 are moved forwardly, thereby collapsing the front legs 112 and the support struts 150 toward the rear legs 132 until the push arms 184, the front legs 112 and the support struts 150 are folded on the rear legs 132.

However, when the stroller frame is folded, the distance between the front casters 124 and the rear wheels 136 is actually increased. This is due to the fact that the rear legs 132 are connected to the front legs 112 via the hinge brackets 118. Hence, when the front legs 112 are collapsed toward the rear legs 132, the front casters 124 move forward relative to the rear wheels 136 since the front casters 124 are connected to the spindles 122 on the front legs 112. The increased distance results in a larger storage space requirement for the folded stroller frame.

SUMMARY OF THE INVENTION

Therefore, the main object of the present invention is to provide a foldable stroller frame assembly that can eliminate the drawback of an increased distance between front and rear wheels when folded.

Another object of the present invention is to provide a foldable stroller frame assembly that has a more compact size when folded to facilitate carrying the same.

Accordingly, a foldable stroller frame assembly of the present invention comprises a bottom frame unit, a front frame unit, a rear frame unit, and a handle unit.

The bottom frame unit includes a generally V-shaped bottom frame member and a wheel mounting frame member. The bottom frame member includes a pair of bottom frame parts, each of which has a front section, a rear section, and a middle section interconnecting the front and rear sections. The front sections of the bottom frame parts are connected to each other. The rear section of each of the bottom frame parts is adapted for mounting rotatably a respective rear wheel thereon. The wheel mounting frame member is connected to the front sections of the bottom frame parts, and is adapted for mounting rotatably a front wheel thereon.

The front frame unit includes a pair of front frame members, each of which has an upper frame section and a lower frame section opposite to the upper frame section and connected pivotally to the front section of a respective one of the bottom frame parts.

The rear frame unit includes a pair of rear frame members, each of which has an upper frame portion and a lower frame portion opposite to the upper frame portion and connected pivotally to the middle section of a respective one of the bottom frame parts.

The handle unit includes a pair of handle arm parts and a handgrip part connected to the handle arm parts. Each of the handle arm parts is pivotable relative to the upper frame section of a respective one of the front frame members and relative to the upper frame portion of a respective one of the rear frame members.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
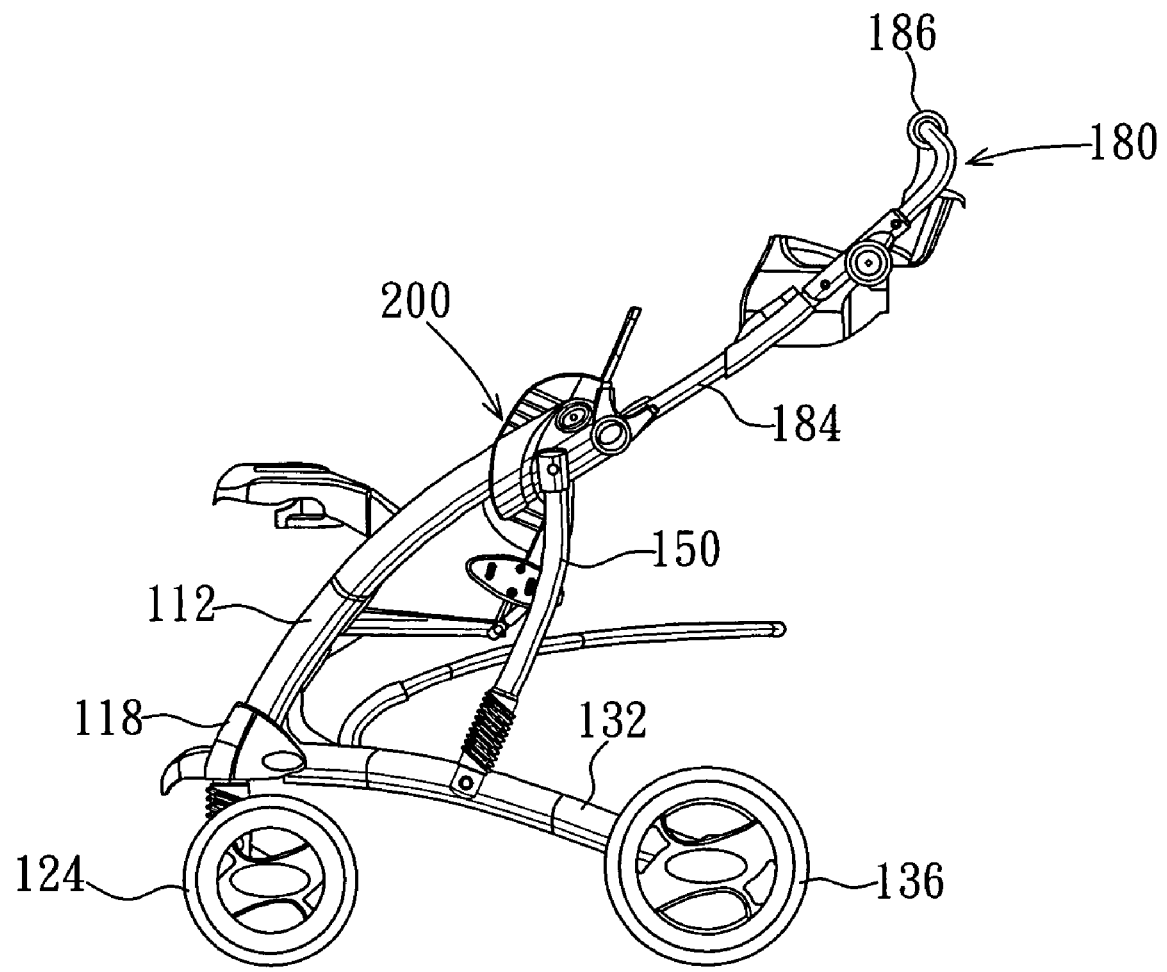
FIG. 1 is a schematic side view to illustrate an unfolded state of a foldable stroller disclosed in U.S. Pat. No. 2003/0201626 A1.
Figure 2:
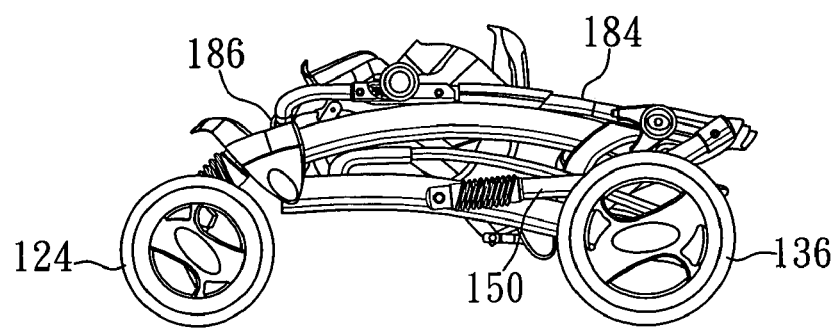
FIG. 2 is a schematic side view to illustrate a folded state of the conventional foldable stroller shown in FIG. 1.
Figure 3:
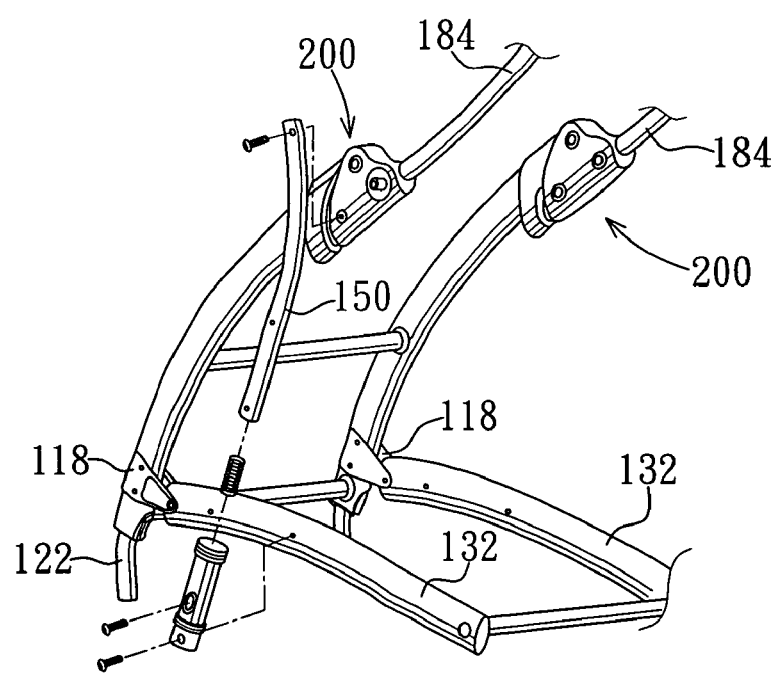
FIG. 3 is a fragmentary perspective view of the conventional foldable stroller shown in FIG. 1.
Figure 4:
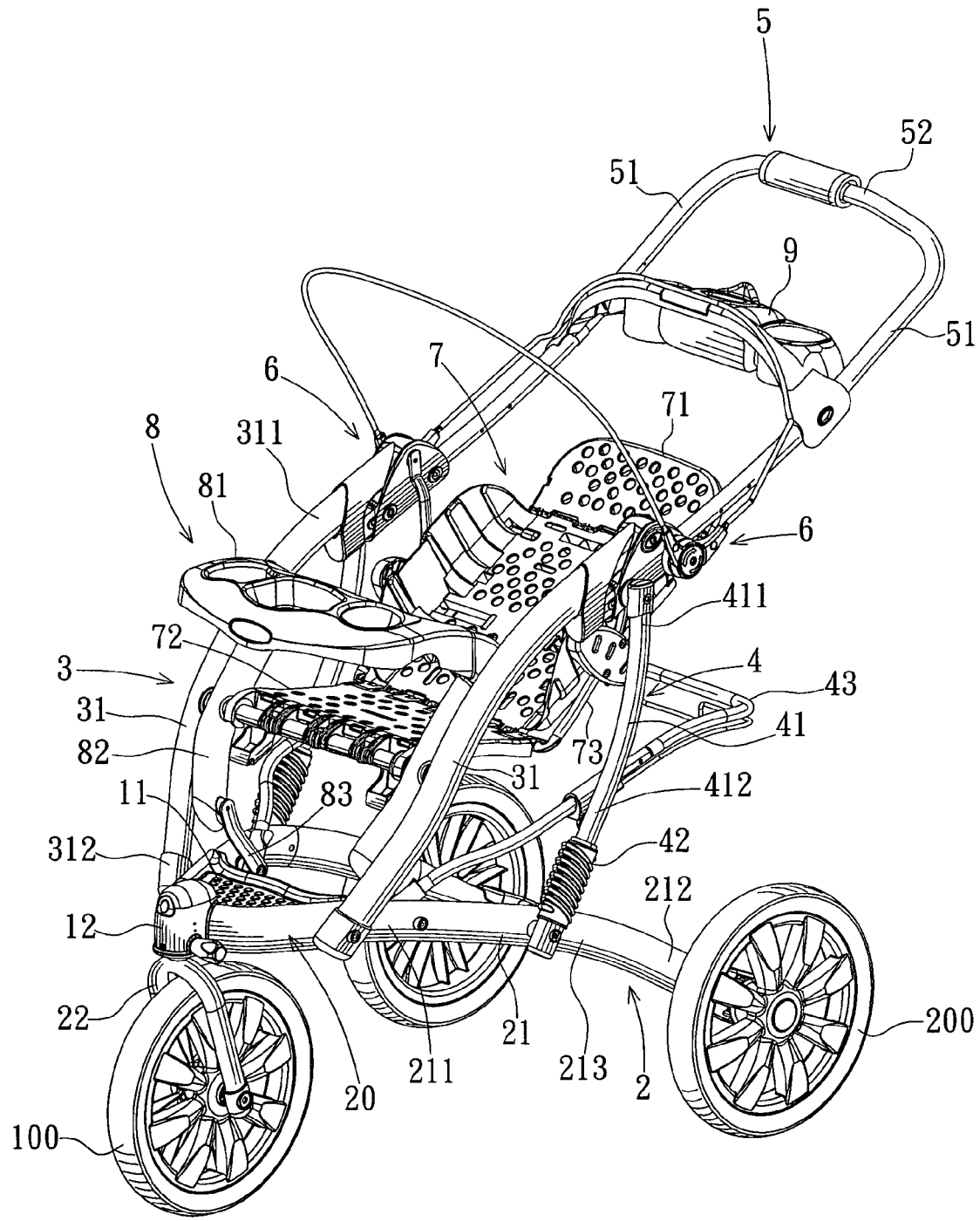
FIG. 4 is an assembled perspective view of the preferred embodiment of a foldable stroller frame assembly according to the present invention.
Figure 5:
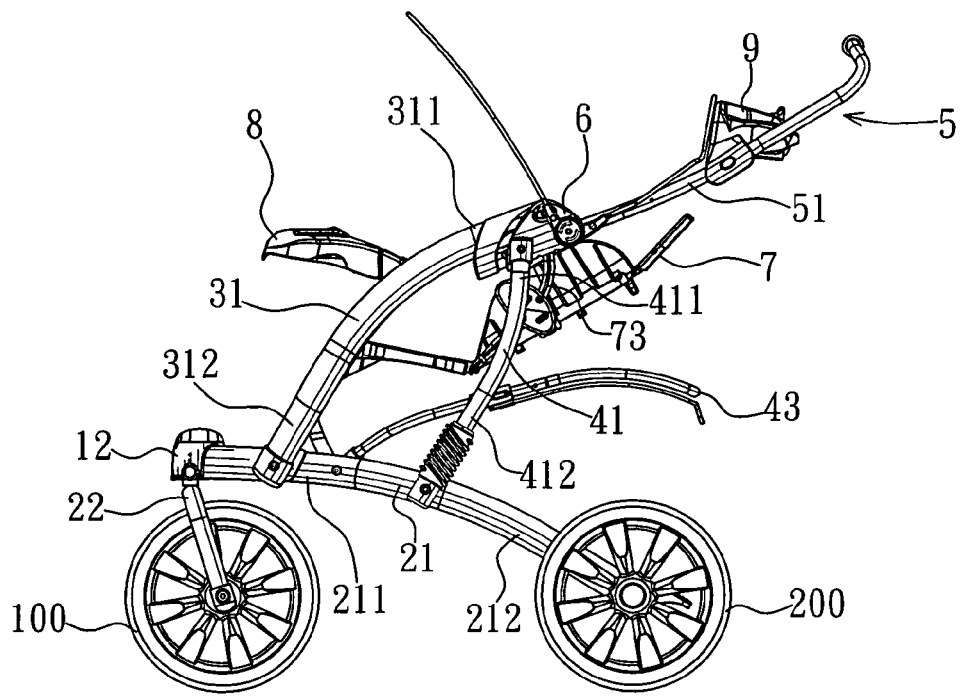
FIG. 5 is a schematic side view to illustrate an unfolded state of the preferred embodiment.

Referring to FIGS. 4 and 5, the preferred embodiment of a foldable stroller frame assembly according to the present invention is shown to be adapted to be mounted with a front wheel 100 and two rear wheels 200, and can be disposed in a selected one of folded and unfolded states (to be described in greater detail hereinafter). The foldable stroller frame assembly comprises a bottom frame unit 2, a front frame unit 3, a rear frame unit 4, and a handle unit 5.

The bottom frame unit 2 includes a generally V-shaped bottom frame member 20 and a wheel mounting frame member 22. The bottom frame member 20 includes a pair of bottom frame parts 21, each of which has a front section 211, a rear section 212, and a middle section 213 interconnecting the front and rear sections 211, 212. The front sections 211 of the bottom frame parts 21 are connected to each other. In view of the generally V-shape of the bottom frame member 20, the distance between the front sections 211 is shorter than that between the rear sections 212. In this embodiment, the bottom frame member 20 is formed by bending a single tube component to configure the tube component into the bottom frame parts 21. The rear section 212 of each of the bottom frame parts 21 is adapted for mounting rotatably a respective one of the rear wheels 200 thereon. The wheel mounting frame member 22 is connected to the front sections 211 of the bottom frame parts 21, and is adapted for mounting rotatably the front wheel 100 thereon. In this embodiment, a coupler 12 is provided on the front sections 211 of the bottom frame parts 21 for coupling rotatably with the wheel mounting frame member 22 so as to permit changes in the direction of the front wheel 100 relative to the bottom frame unit 2. Preferably, a footrest member 11 in the form of a generally triangular plate is mounted to and extends between the front sections 211 of the bottom frame parts 21.

The front frame unit 3 includes left and right front frame members 31, which are tubular rods in this embodiment. Each front frame member 31 has an upper frame section 311 and a lower frame section 312 opposite to the upper frame section 311 and connected pivotally to the front section 211 of a respective one of the bottom frame parts 21.

The rear frame unit 4 includes left and right rear frame members 41, which are tubular rods in this embodiment. Each rear frame member 41 has an upper frame portion 411 and a lower frame portion 412 opposite to the upper frame portion 411 and connected pivotally to the middle section 213 of a respective one of the bottom frame parts 21. In this embodiment, the rear frame unit 4 further includes a pair of shock absorbers 42, each of which interconnects pivotally the lower frame portion 412 of a respective one of the rear frame members 41 to the middle section 213 of the corresponding one of the bottom frame parts 21. The rear frame unit 4 of this embodiment additionally includes a generally U-shaped basket support 43 having a pair of arm sections, each of which is supported by a respective one of the rear frame members 41 and is connected pivotally to a respective one of the bottom frame parts 21. The basket support 43 is adapted to support a utility basket (not shown) for receiving articles therein.

The handle unit 5 includes a pair of handle arm parts 51 and a handgrip part 52 connected to the handle arm parts 51. In this embodiment, the handle unit 5 is formed as an inverted U-shaped tube component. Each of the handle arm parts 51 is pivotable relative to the upper frame section 311 of a respective one of the front frame members 31 and relative to the upper frame portion 411 of a respective one of the rear frame members 41. The handgrip part 52 is adapted for gripping by the user to facilitate pushing or pulling of a stroller that incorporates the foldable stroller frame assembly of this invention.

The foldable stroller frame assembly further comprises a pair of pivot positioning units 6, each of which is connected pivotally to one end of a respective one of the handle arm parts 51 of the handle unit 5, to the upper frame section 311 of a respective one of the front frame members 31 of the front frame unit 3, and to the upper frame portion 411 of a respective one of the rear frame members 41 of the rear frame unit 4. Each of the pivot positioning units 6 is operable to retain releasably the respective one of the handle arm parts 51, the respective one of the front frame members 31, and the respective one of the rear frame members 41 at a selected one of folded and unfolded positions. Since the feature of the invention does not reside in the specific configuration of the pivot positioning units 6, which are known in the art, a detailed description of the same is omitted herein for the sake of brevity.

The foldable stroller frame assembly of this embodiment further comprises a seat unit 7, a food tray unit 8, and an article holding tray 9.

The seat unit 7 includes a seat member 72, a backrest member 71, and an adjusting device 73. The seat member 72, which is in the form of a plate in this embodiment, has a front end connected pivotally to middle sections of the front frame members 31. The back rest member 71, which is also in the form of a plate in this embodiment, is connected tiltably to a rear end of the seat member 72. The adjusting device 73 is connected to the seat member 72, is further connected pivotally to the pivot positioning units 6, abuts against the back rest member 71, and supports the back rest member 71 at a desired inclination relative to the seat member 72. Since the feature of the invention does not reside in the particular construction of the adjusting device 73, which is known in the art, further details of the same are omitted herein for the sake of brevity.

The food tray unit 8 includes a tray body 81, a pair of support arms 82 extending from the tray body 81 and connected pivotally and respectively to the front frame members 31, and a pair of links 83, each of which interconnects a respective one of the support arms 82 and a respective one of the bottom frame parts 21. In this embodiment, the front end of the seat member 72 is connected pivotally to the support arms 82 and the front frame members 31. In addition, the links 83 are connected pivotally to the arm sections of the basket support 43 and the bottom frame parts 21.

The article holding tray 9 is mounted to and extends between the handle arm parts 51 of the handle unit 5, and is adapted for holding articles thereon.

As shown in FIGS. 4 and 5, when the foldable stroller frame assembly is disposed at the unfolded position, the bottom frame parts 21 of the bottom frame member 20 are supported on the ground by the rear wheels 200, as well as by the wheel mounting frame member 22 that is connected to the front wheel 100. In addition, the front frame members 31, the rear frame members 41 and the handle arm parts 51 are positioned by the pivot positioning units 6 such that the front frame members 31, the rear frame members 41 and the handle arm parts 51 extend upwardly and rearwardly so as to place the foldable stroller frame assembly in an unfolded state for use.

Figure 6:
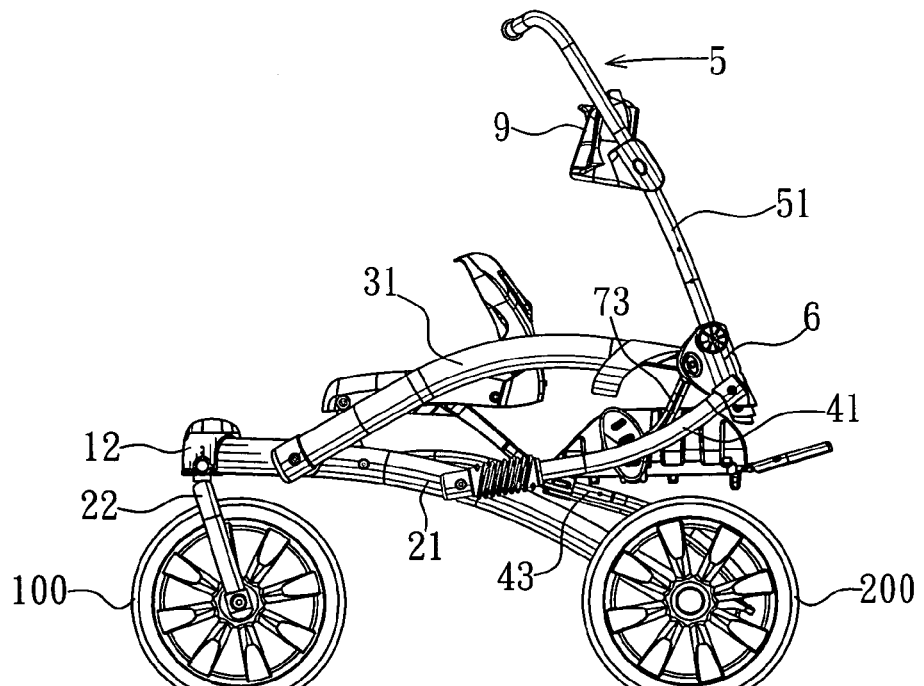
FIG. 6 is a schematic side view to illustrate a partly folded state of the preferred embodiment.
Figure 7:
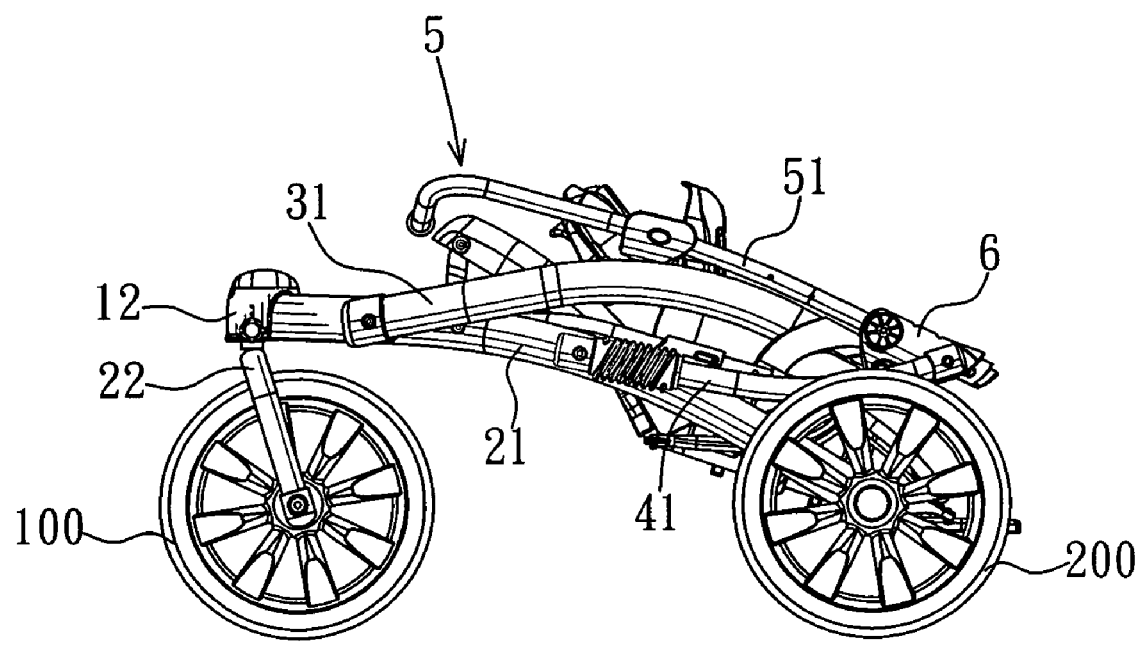
FIG. 7 is a schematic side view to illustrate a folded state of the preferred embodiment.

As shown in FIGS. 6 and 7, to fold the foldable stroller frame assembly, the pivot positioning units 6 are operated to permit pivoting movement of the handle unit 5 toward the front wheel 100. At this time, the upper frame portions 411 of the rear frame members 41 and the upper frame sections 311 of the front frame members 31 pivot relative to the pivot positioning units 6, and the rear frame members 41 and the front frame members 31 are collapsed toward the bottom frame parts 21. At the same time, the seat member 72 and the back rest member 71 of the seat unit 7 are spread apart to be able to lie close to the bottom frame parts 21. Also, due to movement of the front frame members 31, the support arms 82 of the food tray unit 8 pivot relative to the links 83 to be able to move close to the bottom frame parts 21. The tray body 81 is disposed close to the rear wheels 200 when the foldable stroller frame assembly of this invention is in a folded state, as best shown in FIG. 7.

In the foldable stroller frame assembly of this invention, due to the connection between the front frame members 31 and the bottom frame parts 21, and the mounting arrangement of the front and rear wheels 100, 200 on the bottom frame unit 2, folding of the foldable stroller frame unit does not result in an increase in the distance between the front and rear wheels 100, 200, thereby eliminating the drawback of the conventional foldable stroller frame described hereinabove.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A foldable stroller frame assembly comprising:
a bottom frame unit including a generally V-shaped bottom frame member that is formed from a single tube component and that includes a pair of bottom frame parts, each of which has a front section, a rear section, and a middle section interconnecting said front and rear sections, said front sections of said bottom frame parts being connected to each other, said rear section of each of said bottom frame parts being adapted for mounting rotatably a respective rear wheel thereon, and
a wheel mounting frame member connected to said front sections of said bottom frame parts and adapted for mounting rotatably a front wheel thereon;
a front frame unit including a pair of front frame members, each of which has an upper frame section and a lower frame section opposite to said upper frame section and connected pivotally to said front section of a respective one of said bottom frame parts;
a rear frame unit including a pair of rear frame members, each of which has an upper frame portion and a lower frame portion opposite to said upper frame portion and connected pivotally to said middle section of a respective one of said bottom frame parts; and
a handle unit including a pair of handle arm parts and a handgrip part connected to said handle arm parts, each of said handle arm parts being pivotable relative to said upper frame section of a respective one of said front frame members and relative to said upper frame portion of a respective one of said rear frame members; and
a footrest member formed as a generally triangular plate, and mounted to and extending between said front section of said bottom frame parts.

2. The foldable stroller frame assembly as claimed in claim 1, further comprising a pair of pivot positioning units, each of which is connected pivotally to one end of a respective one of said handle arm parts of said handle unit, to said upper frame section of a respective one of said front frame members of said front frame unit, and to said upper frame portion of a respective one of said rear frame members of said rear frame unit,
each of said pivot positioning units being operable to retain releasably the respective one of said handle arm parts, the respective one of said front frame members, and the respective one of said rear frame members at a selected one of folded and unfolded positions.

3. The foldable stroller frame assembly as claimed in claim 2, further comprising a seat unit that includes:
a seat member connected pivotally to said front frame members;
a backrest member connected tiltably to said seat member; and
an adjusting device connected to said seat member, further connected pivotally to at least one of said pivot positioning units, abutting against said backrest member, and supporting said backrest member at a desired inclination relative to said seat member.

4. The foldable stroller frame assembly as claimed in claim 1, further comprising a food tray unit that includes:
a tray body;
a pair of support arms extending from said tray body and connected pivotally and respectively to said front frame members; and
a pair of links, each of which interconnects a respective one of said support arms and a respective one of said bottom frame parts of said bottom frame member of said bottom frame unit.

5. The foldable stroller frame assembly as claimed in claim 1, further comprising an article holding tray mounted to and extending between said handle arm parts of said handle unit.

6. The foldable stroller frame assembly as claimed in claim 1, wherein said rear frame unit further includes a pair of shock absorbers, each of which interconnects pivotally said lower frame portion of a respective one of said rear frame members to said middle section of the corresponding one of said bottom frame parts of said bottom frame member of said bottom frame unit.

7. The foldable stroller frame assembly as claimed in claim 1, wherein said front sections of said bottom frame parts of said bottom frame member of said bottom frame unit are provided with a coupler for coupling rotatably with said wheel mounting member so as to permit changes in the direction of said front wheel relative to said bottom frame unit.

8. The foldable stroller frame assembly as claimed in claim 1, wherein said lower frame sections of said front frame members of said front frame unit are connected pivotally to said front sections of said bottom frame parts of said bottom frame member at a position between said wheel mounting frame member and a respective one of said rear frame members of said rear frame unit.

* * * * *